US012770996B2

(12) United States Patent
Matsuda et al.

(10) Patent No.: US 12,770,996 B2
(45) Date of Patent: Oct. 20, 2026

(54) BATTERY PACK OF VEHICLE

(71) Applicant: KAWASAKI MOTORS, LTD., Akashi (JP)

(72) Inventors: Yoshimoto Matsuda, Akashi (JP); Hiroshi Takeuchi, Akashi (JP)

(73) Assignee: KAWASAKI MOTORS, LTD., Akashi (JP)

( * ) Notice: Subject to any disclaimer, the term of this patent is extended or adjusted under 35 U.S.C. 154(b) by 611 days.

(21) Appl. No.: 18/172,727

(22) Filed: Feb. 22, 2023

(65) Prior Publication Data

US 2023/0307806 A1 Sep. 28, 2023

(30) Foreign Application Priority Data

Mar. 28, 2022 (JP) ................................ 2022-051474

(51) Int. Cl.

*H01M 50/00* (2021.01)
*H01M 50/256* (2021.01)
*H01M 50/593* (2021.01)

(52) U.S. Cl.

CPC ....... *H01M 50/593* (2021.01); *H01M 50/256* (2021.01); *H01M 2220/20* (2013.01)

(58) Field of Classification Search

CPC .... H01M 50/593; H01M 50/256; Y02E 60/10
See application file for complete search history.

(56) References Cited

U.S. PATENT DOCUMENTS

2012/0115015 A1 5/2012 Park et al.
2013/0101883 A1 4/2013 Zhao
2020/0388802 A1 12/2020 Takeuchi

FOREIGN PATENT DOCUMENTS

DE 102018203578 B4 * 9/2022 .......... H01M 50/296
JP 2014532958 A 12/2014
JP 2020198271 A 12/2020
KR 101850439 B1 * 5/2018 ............ H01M 10/48
KR 102023916 B1 * 9/2019 ........... H01R 13/501
WO WO-2018137259 A1 * 8/2018 .......... H01M 50/213

OTHER PUBLICATIONS

GIERE Arrangement for the electrical connection of pole terminals and cell module or battery with such a connection arrangement (I), Sep. 2022. See the Abstract. (Year: 2022).*
Chien, Battery Module, Aug. 2018. See the Abstract. (Year: 2018).*
Zijo et al., Connecting Apparatus For Battery Electrode And Terminal, Sep. 2019, See the Abstract. (Year: 2019).*
Lim et al., Battery Sensor Assembly for Automotive Vehicles, May 2018, See the Abstract. (Year: 2018).*
Japan Patent Office, Office Action Issued in Application No. 2022051474, Oct. 7, 2025, 6 pages.

* cited by examiner

*Primary Examiner* — Tiffany Legette
*Assistant Examiner* — Monique M Wills
(74) *Attorney, Agent, or Firm* — Alleman Hall LLP

(57) ABSTRACT

A battery pack of a vehicle includes a battery cell, a casing accommodating the battery cell, and at least one connector projecting outward from an outer surface of the casing. The casing includes at least one projection projecting outward from the outer surface of the casing. The projection projects in a projecting direction of the connector beyond the connector.

20 Claims, 6 Drawing Sheets

BATTERY PACK OF VEHICLE

CROSS-REFERENCE TO RELATED APPLICATION

This application claims priority to and the benefit of Japanese Patent Application No. 2022-051474 filed on Mar. 28, 2022, the entire disclosure of which is incorporated herein by reference.

BACKGROUND OF THE INVENTION

FIELD OF THE INVENTION

The present disclosure relates to a battery pack of a vehicle.

DESCRIPTION OF THE RELATED ART

Japanese Laid-Open Patent Application Publication No. 2020-198271 discloses a battery pack which is mounted on a vehicle and stores electric power to be supplied to an electric motor that is a traveling driving source of the vehicle. The battery pack includes battery cells and a casing that accommodates the battery cells. A connector that is electrically connected to the battery cells is located at the casing.

The connector projects outward from an outer surface of the casing. Therefore, for example, if a worker carelessly drops the battery pack onto a ground surface while handling the battery pack, the connector may be damaged.

SUMMARY OF THE INVENTION

An object of one aspect of the present disclosure is to prevent the damage of a connector by a simple configuration.

A battery pack of a vehicle according to one aspect of the present disclosure includes: a battery cell; a casing accommodating the battery cell; and at least one connector projecting outward from an outer surface of the casing. The casing includes at least one projection projecting outward from the outer surface of the casing. The projection projects in a projecting direction of the connector beyond the connector.

DESCRIPTION OF THE PREFERRED EMBODIMENTS

Hereinafter, embodiments will be described with reference to the drawings.

Embodiment 1

Figure 1:
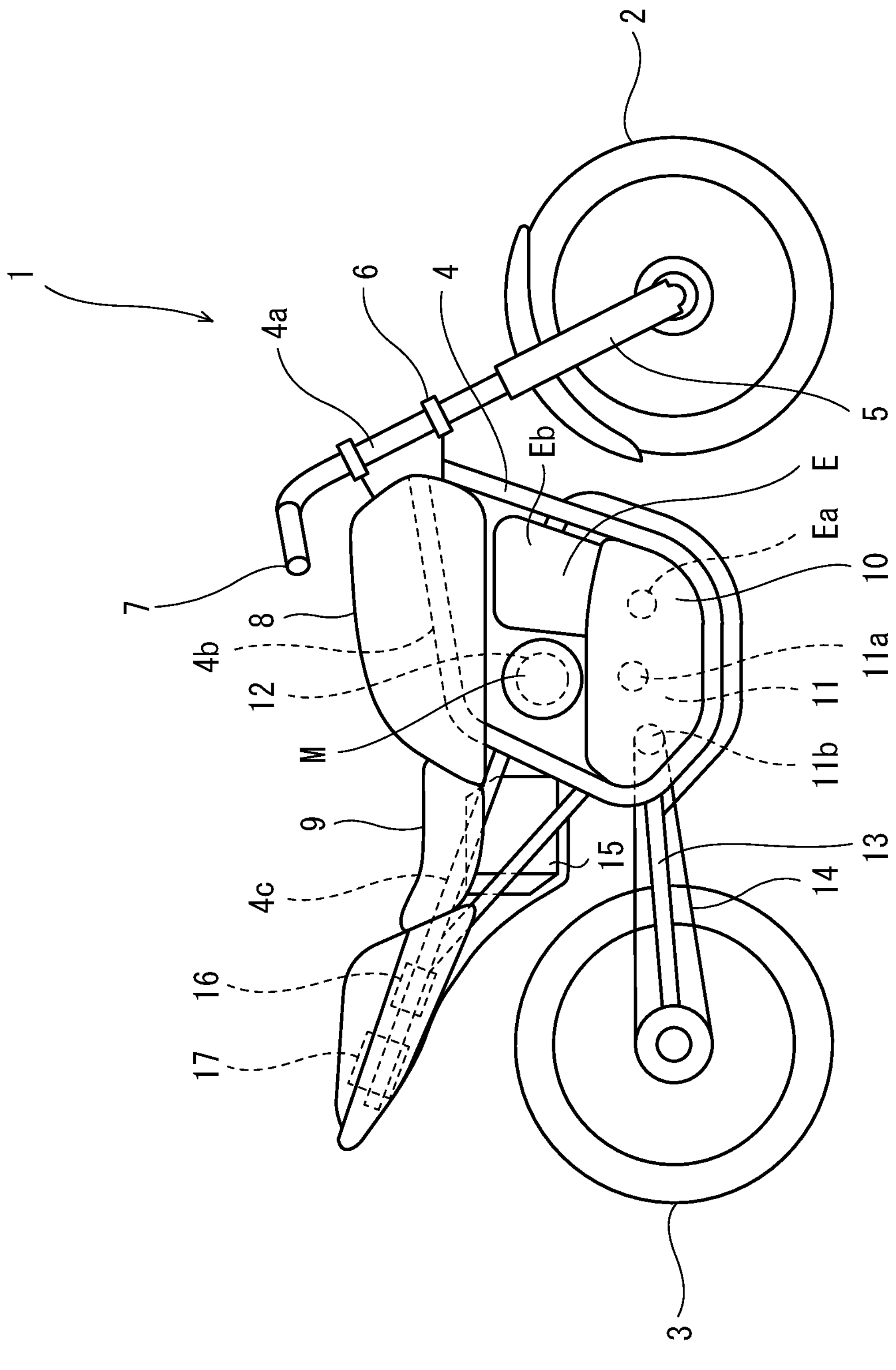
FIG. 1 is a side view of a straddled vehicle according to Embodiment 1.

FIG. 1 is a side view of a straddled vehicle 1 according to Embodiment 1. As shown in FIG. 1, the straddled vehicle 1 is, for example, a motorcycle but may be an automatic three-wheeled vehicle or the like. The straddled vehicle 1 is a hybrid vehicle including an internal combustion engine and an electric motor but may be an electric vehicle that does not include an internal combustion engine. The vehicle 1 may be a four-wheeled vehicle that is not a straddled vehicle. The straddled vehicle 1 includes: a front wheel 2 (driven wheel); a rear wheel 3 (driving wheel); a vehicle body frame 4; a front suspension 5 that connects the front wheel 2 to a front portion of the vehicle body frame 4; and a rear suspension that connects the rear wheel 3 to a rear portion of the vehicle body frame 4. A steering shaft connected to a handlebar 7 is connected to a bracket 6 to which the front suspension 5 is connected. The steering shaft is supported by a head pipe **4*a* of the vehicle body frame 4** so as to be angularly displaceable.

The vehicle body frame 4 includes: a main frame **4*b* extending rearward from the head pipe 4*a*; a seat support frame 4*c* extending rearward from an upper-rear portion of the main frame 4*b*; and an auxiliary frame 4*d* that extends from a lower portion of the main frame 4*b* toward the seat support frame 4*c* and supports the seat support frame 4*c* from a lower side. A fuel tank 8 is located behind the handlebar 7. A seat 9 on which a rider is seated is located behind the fuel tank 8. The fuel tank 8 is supported by the main frame 4*b*. The seat 9 is supported by the seat support frame 4*c*. An internal combustion engine E that is a traveling power source is mounted on the main frame 4*b*. An electric motor M that is a traveling power source is located in the vicinity of the engine E. The straddled vehicle 1** is a parallel hybrid vehicle but may be a series hybrid vehicle.

A crankcase 10 is located at a lower portion of a cylinder Eb of the engine E. The crankcase 10 extends rearward beyond the cylinder Eb. The electric motor M that generates driving power to be transmitted to the rear wheel 3 is located behind the cylinder Eb of the engine E and above the crankcase 10. The electric motor M is supported by the main frame **4*b* through the crankcase 10. An inverter 12** is integrated with the electric motor M. However, an inverter may be located at a position away from the electric motor M.

A transmission 11 is located inside the crankcase 10. The transmission 11 includes an input shaft **11*a*, an output shaft 11*b*, and a transmission gear that transmits rotation from the input shaft 11*a* to the output shaft 11*b* while changing the speed of the rotation. Power is transmitted from a crankshaft Ea of the engine E through a main clutch to the input shaft 11*a*. Moreover, power is transmitted from the electric motor M through a power transmission structure (for example, a gear, a belt, or a chain) to the input shaft 11*a* of the transmission 11. A swing arm 13 that supports the rear wheel 3 and extends in a front-rear direction is supported by the vehicle body frame 4 so as to be angularly displaceable. Rotational power of the output shaft 11*b*** of the transmission

11 is transmitted to the rear wheel 3 through an output transmission structure 14 (for example, a chain, a belt, or a drive shaft).

A battery pack 15 supported by the seat support frame 4*c* is located behind the electric motor M and under the seat 9. The battery pack 15 is exposed to an outside of the straddled vehicle 1. The battery pack 15 stores electric power to be supplied to the electric motor M through the inverter 12. A DCDC converter 16 supported by the seat support frame 4*c* is located behind the battery pack 15. The DCDC converter 16 lowers the voltage of the electric power output from the battery pack 15.

An auxiliary battery 17 supported by the seat support frame 4*c* is located behind the DCDC converter 16. The voltage of the electric power output from the battery pack 15 is lowered by the DCDC converter 16, and this electric power is supplied to the auxiliary battery 17. To be specific, the battery pack 15 outputs high-voltage electric power that drives the electric motor M as a traveling driving source, and the auxiliary battery 17 outputs low-voltage electric power that is supplied to electric components (such as an ECU).

Figure 2:
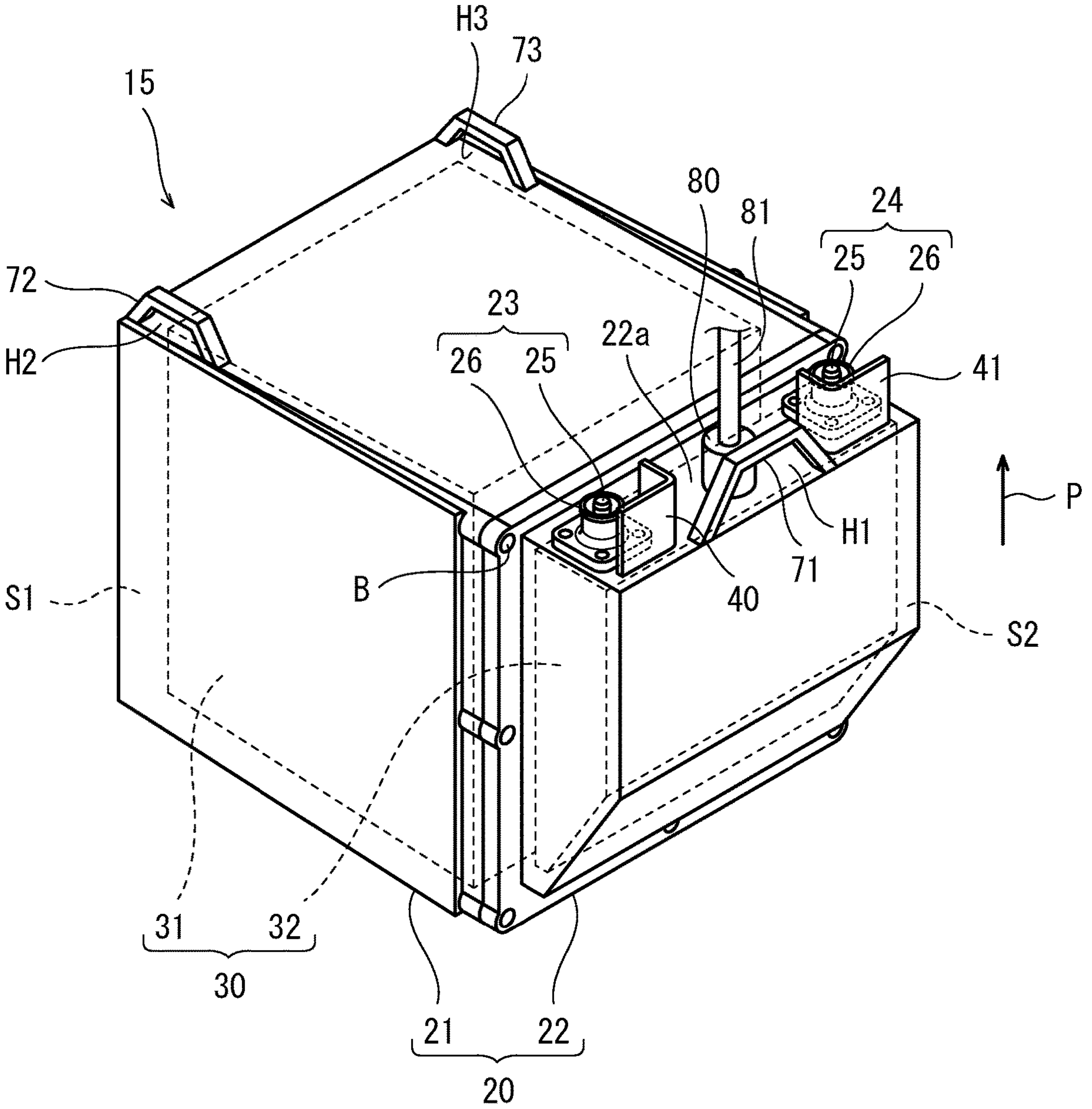
FIG. 2 is a perspective view of a battery pack of FIG. 1 when viewed from a rear-upper side.

FIG. 2 is a perspective view of the battery pack 15 of FIG. 1 when viewed from a rear-upper side. As shown in FIG. 2, the battery pack 15 includes a casing 20 that is practically a rectangular solid. The casing 20 includes: a casing main body 21 that defines a battery cell accommodation space S1; and a cover 22 that defines an electric component accommodation space S2. The casing main body 21 has such a shape that one surface of a hexahedron is open. The cover 22 has a recessed shape. The cover 22 closes an opening of the casing main body 21 and is detachably fixed to the casing main body 21 with fasteners B (such as bolts).

An internal structure 30 including a battery cell assembly 31 and an electric component assembly 32 is accommodated in the casing 20. The battery cell assembly 31 is an assembly of battery cells electrically connected to each other. The electric component assembly 32 is an assembly of electric components (such as a relay, a fuse, and a current sensor) electrically connected to the battery cell assembly 31. The electric component assembly 32 is fixed to the battery cell assembly 31. The battery cell assembly 31 is located in the battery cell accommodation space S1 of the casing main body 21. It is preferable that a radiating fin be located on a side wall of the casing main body 21. The electric component assembly 32 is located in the electric component accommodation space S2 of the cover 22.

A positive connector 23 and a negative connector 24 which are electrically connected to the internal structure 30 are attached to the cover 22. The positive connector 23 and the negative connector 24 are separable from the casing 20. The positive connector 23 is located at a corner of an outer surface 22*a* (of the cover 22) of the casing 20. The negative connector 24 is located at another corner of the outer surface 22*a* (of the cover 22) of the casing 20. The positive connector 23 and the negative connector 24 may be located at the casing main body 21. The positive connector 23 and the negative connector 24 are the same in structure as each other. Therefore, the following will mainly describe the positive connector 23.

Figure 3:
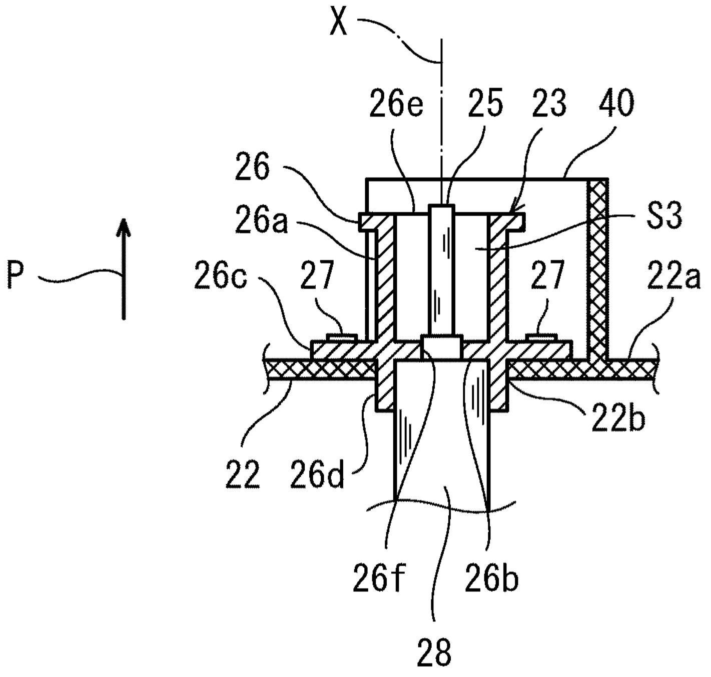
FIG. 3 is a sectional view of a connector of the battery pack of FIG. 2.

FIG. 3 is a sectional view of the positive connector 23 of the battery pack 15 of FIG. 2. As shown in FIG. 3, the connector 23 projects upward from the upper outer surface 22*a* of the cover 22. The connector 23 includes: an electrode terminal 25 projecting upward beyond the upper outer surface 22*a* of the cover 22; and a connector housing 26 projecting upward beyond the upper outer surface 22*a* of the cover 22 and surrounding the electrode terminal 25. Specifically, the electrode terminal 25 is columnar. The connector housing 26 includes a peripheral wall portion 26*a*, a bottom wall portion 26*b*, a flange portion 26*c*, and a holding portion 26*d*.

The peripheral wall portion 26*a* has a tubular shape (for example, a cylindrical shape) and defines a terminal space S3. The peripheral wall portion 26*a* includes an opening 26*e* through which the terminal space S3 is open upward. The bottom wall portion 26*b* closes a lower end opening of the peripheral wall portion 26*a*. The bottom wall portion 26*b* includes a through hole 26*f*. The electrode terminal 25 passes through the through hole 26*f* and is located in the terminal space S3. The electrode terminal 25 is locked to the bottom wall portion 26*b*. The flange portion 26*c* projects from an outer peripheral surface of the peripheral wall portion 26*a* which is close to the bottom wall portion 26*b*. The flange portion 26*c* is placed on the upper outer surface 22*a* of the cover 22 and is fixed to the cover 22 with screws 27.

The holding portion 26*d* has a tubular shape (for example, a cylindrical shape), and an electric wire 28 is inserted into the holding portion 26*d*. With the electric wire 28 held by the holding portion 26*d*, a conductor of the electric wire 28 is connected to the electrode terminal 25. The holding portion 26*d* is fitted in an insertion hole 22*b* of the cover 22. The electric wire 28 is electrically connected to the battery cell assembly 31 through the electric component assembly 32. To be specific, the positive connector 23 (the electrode terminal 25 of the positive connector 23) is electrically connected to the battery cell assembly 31 through the electric wire 28.

Figure 4:
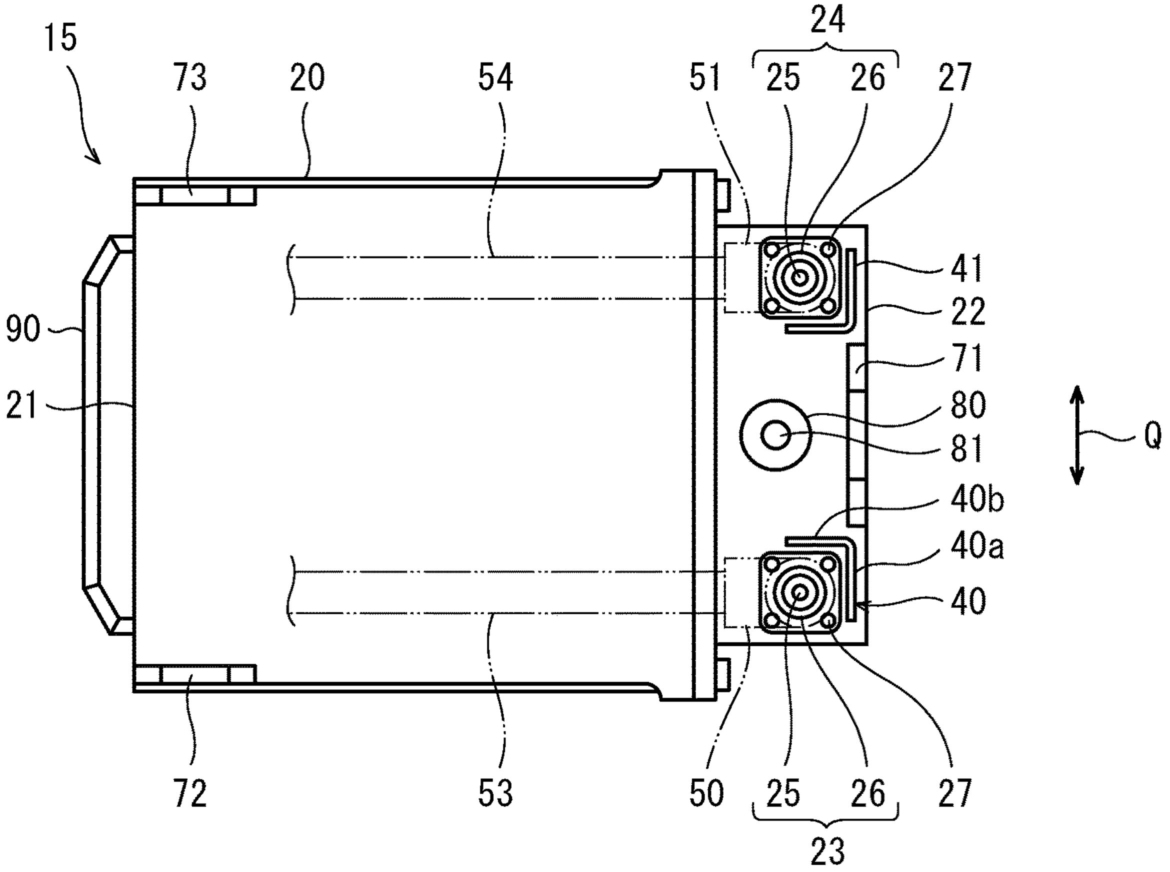
FIG. 4 is a plan view of the battery pack of FIG. 2.
Figure 5:
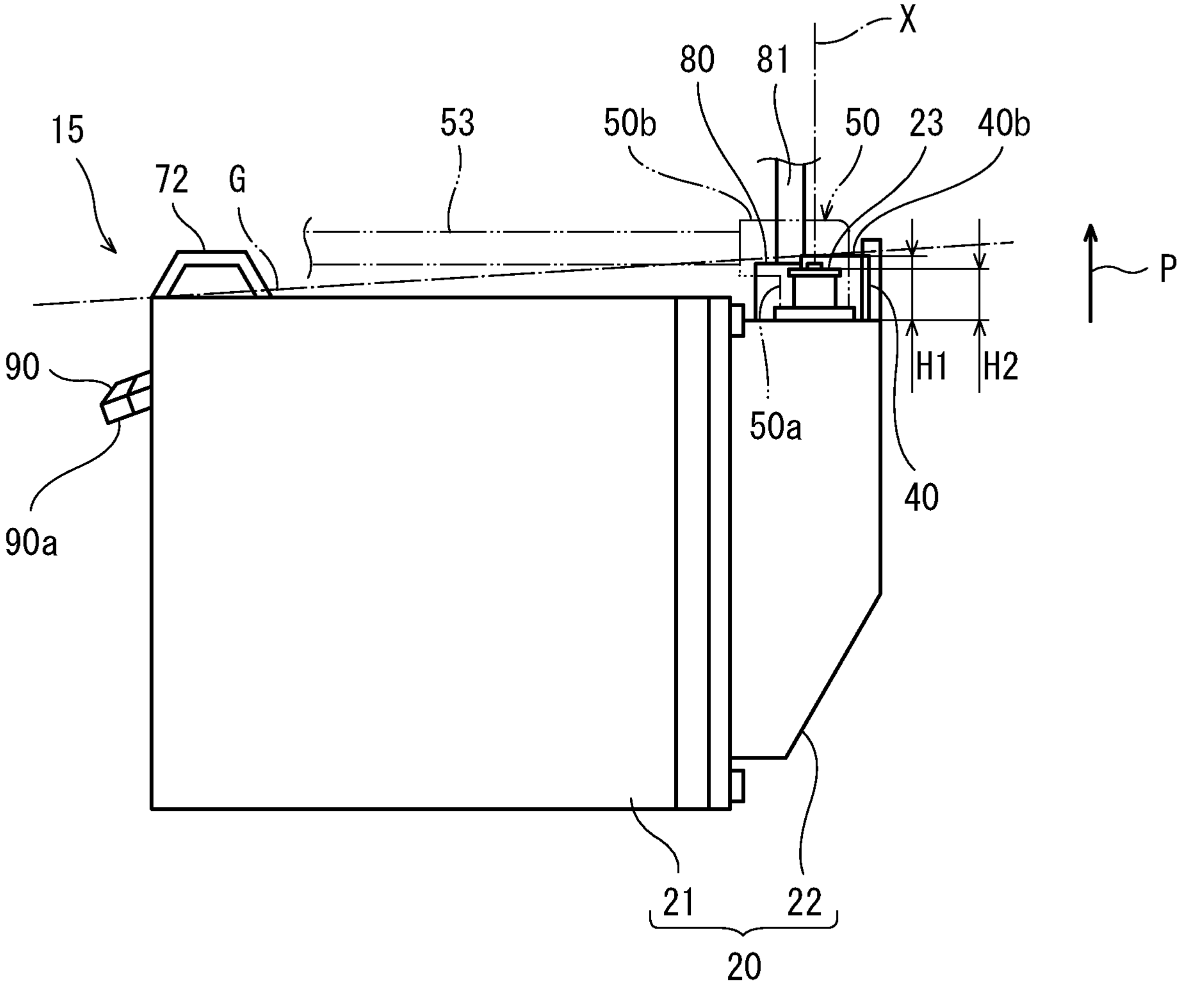
FIG. 5 is a side view of the battery pack of FIG. 2.
Figure 6:
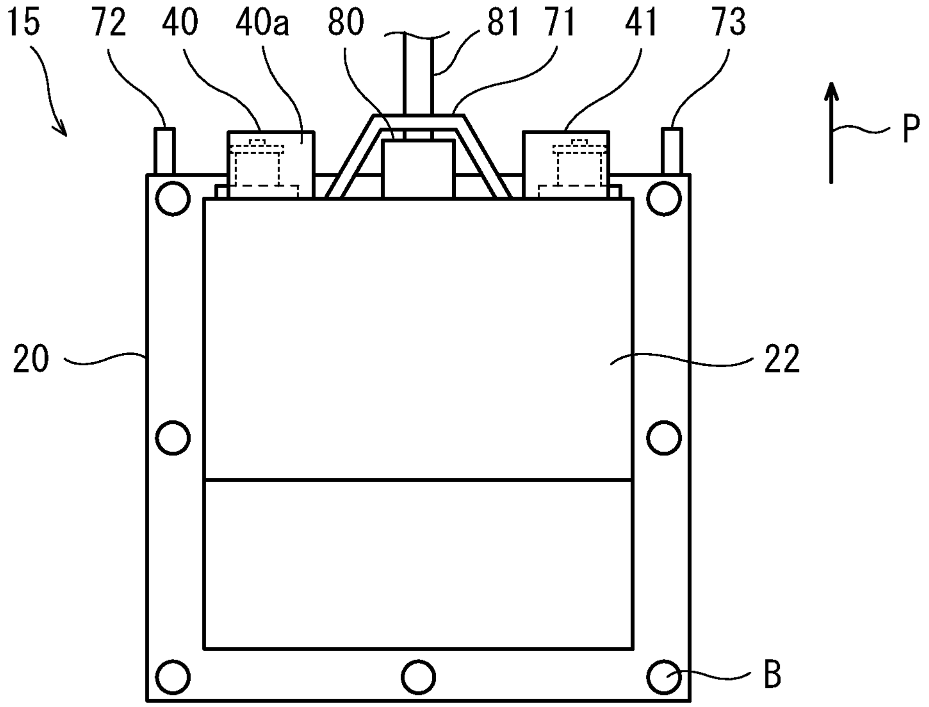
FIG. 6 is a rear view of the battery pack of FIG. 2.

FIG. 4 is a plan view of the battery pack 15 of FIG. 2. FIG. 5 is a side view of the battery pack 15 of FIG. 2. FIG. 6 is a rear view of the battery pack 15 of FIG. 2. As shown in FIGS. 2 to 6, the cover 22 includes a pair of projections 40 and 41 projecting upward from the upper outer surface 22*a*. A projecting direction of each of the projections 40 and 41 is the same as a projecting direction P of each of the connectors 23 and 24. The projection 40 is adjacent to the positive connector 23, and the projection 41 is adjacent to the negative connector 24. To be specific, the projection 40 is located closer to the positive connector 23 than to the negative connector 24, and the projection 41 is located closer to the negative connector 24 than to the positive connector 23. The projecting direction P of the positive connector 23 and the projecting direction P of the negative connector 24 are the same as each other but may be different from each other.

The projection 40 projects in the projecting direction P of the positive connector 23 beyond the positive connector 23. The projection 41 projects in the projecting direction P of the negative connector 24 beyond the negative connector 24. A projection dimension H1 of the projection 40 from the outer surface 22*a* of the cover 22 is larger than a projection dimension H2 of the positive connector 23 from the outer surface 22*a* of the cover 22. The projection dimension H1 of the projection 41 from the outer surface 22*a* of the cover 22 is larger than the projection dimension H2 of the negative connector 24 from the outer surface 22*a* of the cover 22. The projections 40 and 41 are located between the positive connector 23 and the negative connector 24 which are located away from each other. The projection 40 and the projection 41 are located away from each other.

The projection 40 and the projection 41 are the same in configuration as each other. Therefore, the following will mainly describe the projection 40. The projection 40 projects integrally from the outer surface 22*a* of the cover 22. To be specific, the projection 40 and the outer surface 22*a* are integrated as one piece. The projection 40 projects so as to cover the flange portion 26*c* of the connector housing 26 from a lateral side.

The projection 40 is located partially around the connector 23. When viewed from the projecting direction P, the projection 40 exposes a part of the periphery of the connector 23 to a lateral side so as not to surround the entire periphery of the connector 23. To be specific, the projection 40 includes an opening through which the connector 23 is exposed in a direction orthogonal to the projecting direction P. The projection 40 is adjacent to the connector 23 so as to be spaced apart from the connector 23 in two directions orthogonal to each other when viewed from the projecting direction P. The projection 40 is a plate-shaped wall. The projection 40 has an L shape when viewed from the projecting direction P. To be specific, the projection 40 includes: a first wall portion 40*a* that covers the connector 23 in one direction orthogonal to the projecting direction P; and a second wall portion 40*b* that covers the connector 23 in another direction orthogonal to the projecting direction P and is orthogonal to the first wall portion 40*a*.

The first wall portion 40*a* and the second wall portion 40*b* are in connection with each other but may be separated from each other. To be specific, the projection 40 may be divided into walls. The projection 40 is located only in a region of 180 degrees or less around the connector 23. When viewed from the projecting direction P, the projection 40 is located along an outer shape of the flange portion 26*c* of the connector housing 26. When viewed from the projecting direction P, the flange portion 26*c* of the connector housing 26 has a square shape but may have another shape (for example, a circular shape).

When viewed from the projecting direction P, a part of the projection 40 is located closer to an outside of the casing 20 than the connector 23 is. Specifically, when viewed from the projecting direction P, the first wall portion 40*a* of the projection 40 is located between an outer edge of the casing 20 and the connector 23. When viewed from a direction in which the connector 23 and the first wall portion 40*a* are lined up (for example, in a rear view in FIG. 6), the first wall portion 40*a* of the projection 40 overlaps the connector 23. More specifically, the first wall portion 40*a* of the projection 40 covers and hides the connector 23. When viewed from the direction in which the connector 23 and the first wall portion 40*a* are lined up, the first wall portion 40*a* may partially overlap the connector 23.

Among all virtual flat surfaces that pass through a point on an outer surface of the casing 20 and a point of a projection end of the projection 40, a virtual flat surface G (see FIG. 5) that is closest to the connector 23 is located outwardly away from the connector 23. Therefore, assuming that the virtual flat surface G is a flat ground surface, the ground surface that has contacted the battery pack 15 do not contact the connector 23 even when the battery pack is in any posture.

The second wall portion 40*b* of the projection 40 is located between the positive connector 23 and the negative connector 24. A direction in which the connector 23 and the second wall portion 40*b* are lined up is the same as an arrangement direction Q of the two connectors 23 and 24. When viewed from the arrangement direction Q (for example, in a side view in FIG. 5), the second wall portion 40*b* overlaps the connector 23. More specifically, the second wall portion 40*b* partially overlaps the connector 23. The second wall portion 40*b* may entirely overlap the connector 23 when viewed from the arrangement direction Q.

A positive cable connector 50 is detachably fitted to the positive connector 23, and a negative cable connector 51 is detachably fitted to the negative connector 24. The positive cable connector 50 is coupled to an end portion of an electric cable 53, and the negative cable connector 51 is coupled to an end portion of an electric cable 54. The electric cables 53 and 54 are electrically connected to the inverter 12 (see FIG. 1). The positive cable connector 50 and the negative cable connector 51 are the same in structure as each other. Therefore, the following will mainly describe the positive cable connector 50.

The cable connector 50 is an L-shaped connector. The electric cable 53 extends in a direction orthogonal to the projecting direction P. A direction in which the cable connector 50 is fitted to the connector 23 coincides with the projecting direction P. The cable connector 50 includes: a fitting portion 50*a* that is fitted to the connector 23; and a holding portion 50*b* that holds the electric cable 53. An outer peripheral surface of the fitting portion 50*a* is cylindrical. The holding portion 50*b* projects from the fitting portion 50*a* in a direction orthogonal to the fitting portion 50*a*.

With the cable connector 50 fitted to the connector 23, the holding portion 50*b* and the electric cable 53 overlap the projection 40 when viewed from a direction orthogonal to the projecting direction P. To be specific, with the cable connector 50 fitted to the connector 23, the position of the holding portion 50*b* in the projecting direction P overlaps the position of the projection 40 in the projecting direction P.

In a direction orthogonal to the projecting direction P, a distance from an axis X of the electrode terminal 25 to the outer peripheral surface of the fitting portion 50*a* is shorter than a distance from the axis X of the electrode terminal 25 to the projection 40. In a direction orthogonal to the projecting direction P, a distance to the axis X from a portion of an outer surface of the holding portion 50*b* which is farthest from the axis X of the electrode terminal 25 is longer than a distance from the axis X of the electrode terminal 25 to the projection 40.

The holding portion 50*b* of the cable connector 50 passes through a region which is located around the connector 23 and at which the projection 40 does not exist. In a direction in which the electric cable 53 extends from the cable connector 50, the projection 40 does not exist when viewed from the connector 23. With the cable connector 50 fitted to the connector 23, the cable connector 50 is turnable relative to the connector 23 around the axis X of the electrode terminal 25.

Figure 7:
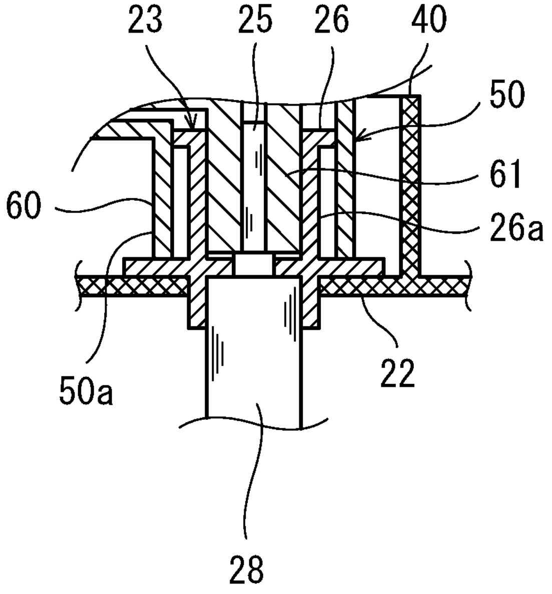
FIG. 7 is a sectional view showing that a cable connector is fitted to the connector of FIG. 2.

FIG. 7 is a sectional view showing that the cable connector 50 is fitted to the connector 23 of FIG. 2. As shown in FIG. 7, the cable connector 50 includes a connector housing 60 and an electrode terminal 61 accommodated in the connector housing 60. The connector housing 60 of the cable connector 50 is externally fitted to the peripheral wall portion 26*a* of the connector housing 26 of the connector 23. The electrode terminal 61 has a cylindrical shape. The electrode terminal 61 is inserted into a space between the peripheral wall portion 26*a* of the connector housing 26 of the connector 23 and the electrode terminal 25 of the connector 23. With the cable connector 50 fitted to the connector 23, the cable connector 50 is turnable relative to the connector 23 around the electrode terminal 25. The cable connector 50 includes a lock structure that prevents the cable connector 50 from coming off from the connector 23.

As shown in FIG. 2, the casing 20 includes hook insertion holes H1 to H3 exposed to an outside of the casing 20. Specifically, the casing 20 includes: an arch 71 projecting from an upper surface of the cover 22 so as to define the hook insertion hole H1; an arch 72 projecting from an upper surface of the casing main body 21 so as to define the hook insertion hole H2; and an arch 73 projecting from the upper surface of the casing main body 21 so as to define the hook insertion hole H3. A communication cable connection portion 80 is on the upper surface of the cover 22 of the casing 20 so as to be located between the positive connector 23 and the negative connector 24. A communication cable 81 extending from the electric component accommodation space S2 to an outside of the casing 20 is connected to the communication cable connection portion 80.

As shown in FIG. 4, in a plan view, the arches 71 to 73 are distributed so as to surround the center of gravity of the battery pack 15. The communication cable connection portion 80 is located between the pair of projections 40 and 41. The arch 71 is adjacent to the cable connecting portion 80 in a direction orthogonal to the arrangement direction Q of the two connectors 23 and 24.

As shown in FIGS. 4 and 5, the casing 20 includes a grip 90 that projects in a horizontal direction from a side surface of the casing 20 like an eave. Herein, the side surface of the casing 20 is a surface extending in an upper-lower direction as a whole and denotes, for example, any one of a front surface, a left surface, a right surface, and a rear surface. With the battery pack 15 placed on a horizontal surface, a lower surface 90*a* of the grip 90 is inclined relative to a virtual horizontal plane. The lower surface 90*a* of the grip 90 extends diagonally downward toward a projection end of the grip 90. The lower surface 90*a* of the grip 90 is a lift surface which faces downward and with which a finger of a worker can contact from a lower side. The lift surface may be not a lower surface of a projecting portion such as the grip 90, but a ceiling surface, i.e., an upper surface of a recessed portion located on the side surface of the casing 20.

According to the above-described configuration, even when the connectors 23 and 24 project outward from the outer surface 22*a* of the casing 20, and the battery pack 15 falls onto the ground surface, the projections 40 and 41 of the casing 20 contact the ground surface, and this can prevent the connectors 23 and 24 from contacting the ground surface. Therefore, the damages of the connectors 23 and 24 can be prevented by such simple configuration.

The projection 40 (41) is located partially around the connector 23(24) so as not to completely surround the connector 23 (24). Therefore, dust and water can be prevented from being accumulated in a space between the projection 40 (41) and the connector 23 (24).

The projections 40 and 41 are located between the two connectors 23 and 24. Therefore, the two connectors 23 and 24 can be protected by the projections 40 and 41.

The two connectors 23 and 24 located at both sides of the projections 40 and 41 are the positive connector 23 and the negative connector 24 which are electrically connected to the battery cell assembly 31. Therefore, a short circuit between the positive connector 23 and the negative connector 24 can be prevented by the projections 40 and 41.

The projection 40 (41) is adjacent to the connector 23 (24) so as to be spaced apart from the connector 23 (24) in two directions orthogonal to each other when viewed from the projecting direction P. To be specific, the projection 40 (41) covers the connector 23(24) in the two directions orthogonal to each other when viewed from the projecting direction P. Therefore, even when a direction in which the battery pack 15 collides with an obstacle is unknown, the connectors 23 and 24 can be suitable protected.

Each of the projections 40 and 41 has an L shape when viewed from the projecting direction P. Therefore, the strengths of the projections 40 and 41 can be increased. Moreover, attaching and detaching work of the cable connectors 50 and 51 fitted to the connectors 23 and 24 of the battery pack 15 can be facilitated, and the degree of freedom in wiring of the electric cables 53 and 54 extending from the cable connectors 50 and 51 can be improved.

The first wall portion 40*a* of the projection 40 (41) is located closer to an outside of the casing 20 than the connector 23 (24), which is located at a corner of the outer surface 22*a* of the casing 20, is. Therefore, as compared to when the connector 23 (24) is located closer to an outside of the casing 20 than the projection 40 (41) is, the connector 23 (24) can be protected while suppressing the height of the projection 40 (41).

When viewed from one direction orthogonal to the projecting direction P, the projection 40 (41) covers the connector 23 (24). Therefore, the connector 23 (24) can be suitably protected.

The cover 22 of the casing 20 and the projections 40 and 41 are integrated as one piece. Therefore, an increase in assembling man-hours of the battery pack 15 can be prevented.

The casing 20 includes the hook insertion holes H1 to H3 exposed to an outside of the casing 20. Therefore, the battery pack 15 can be lifted up with a crane by inserting a hook or a rope into each of the hook insertion holes H1 to H3.

The side surface of the casing 20 includes the lift surface 90*a* which faces downward and with which a finger of a worker can contact from a lower side. Therefore, even when the finger of the worker cannot contact the lower surface of the battery pack 15 placed on the ground surface, the worker can easily handle the battery pack 15 by lifting up the lift surface 90*a* with the finger of the worker.

Embodiment 2

Figure 8:
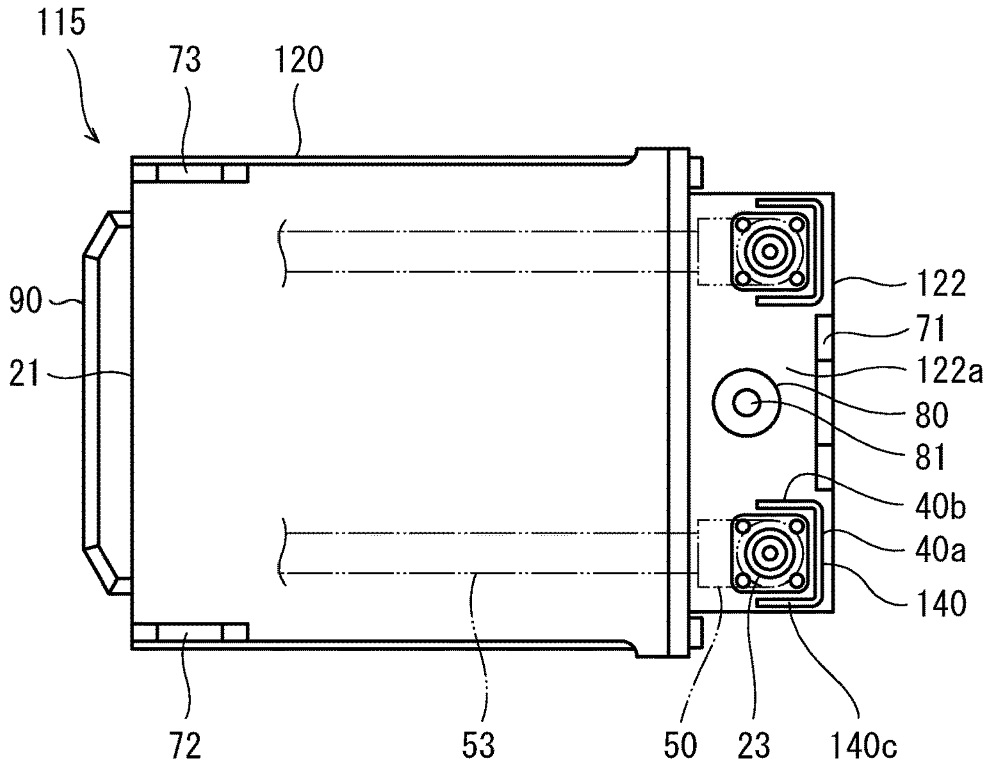
FIG. 8 is a plan view of the battery pack according to Embodiment 2.

FIG. 8 is a plan view of a battery pack 115 according to Embodiment 2. The same reference signs are used for the same components as in Embodiment 1, and the repetition of the same explanation is avoided. As shown in FIG. 8, the shape of a projection 140 of Embodiment 2 is different from the shape of the projection 40 of Embodiment 1. A casing 120 (a cover 122 of the casing 120) of the battery pack 115 includes the projection 140 which projects from an outer surface 122*a* of the casing 120 and has a horseshoe shape when viewed from the projecting direction P of the connector 23. The projection 140 is a plate-shaped wall.

Specifically, the projection 140 includes: the first wall portion 40*a* that covers the connector 23 from one direction (for example, from a rear side) orthogonal to the projecting direction P; the second wall portion 40*b* that covers the connector 23 from another direction (for example, from one lateral side) orthogonal to the projecting direction P and is orthogonal to the first wall portion 40*a*; and a third wall portion 140*b* that covers the connector 23 in yet another direction (for example, from another lateral side) orthogonal to the projecting direction P and is orthogonal to the first wall portion 40*a*. The first wall portion 40*a* and the second wall portion 40*b* are formed in an L shape when viewed from the projecting direction P. The first wall portion 40*a* and the third wall portion 140*b* are formed in an L shape when viewed from the projecting direction P. To be specific, the projection 140 includes an L-shaped portion. The cable connector 50 passes through an opening of the projection 140 having a horseshoe shape when viewed from the projecting direction P.

According to this, since the projection 140 covers the connector 23 in three directions, the damage of the connector 23 can be more suitably prevented. Moreover, since the projection 140 includes two bent portions, the strength of the projection 140 can be improved. Since the other configurations are the same as those in Embodiment 1, the explanations thereof are omitted.

Embodiment 3

Figure 9:
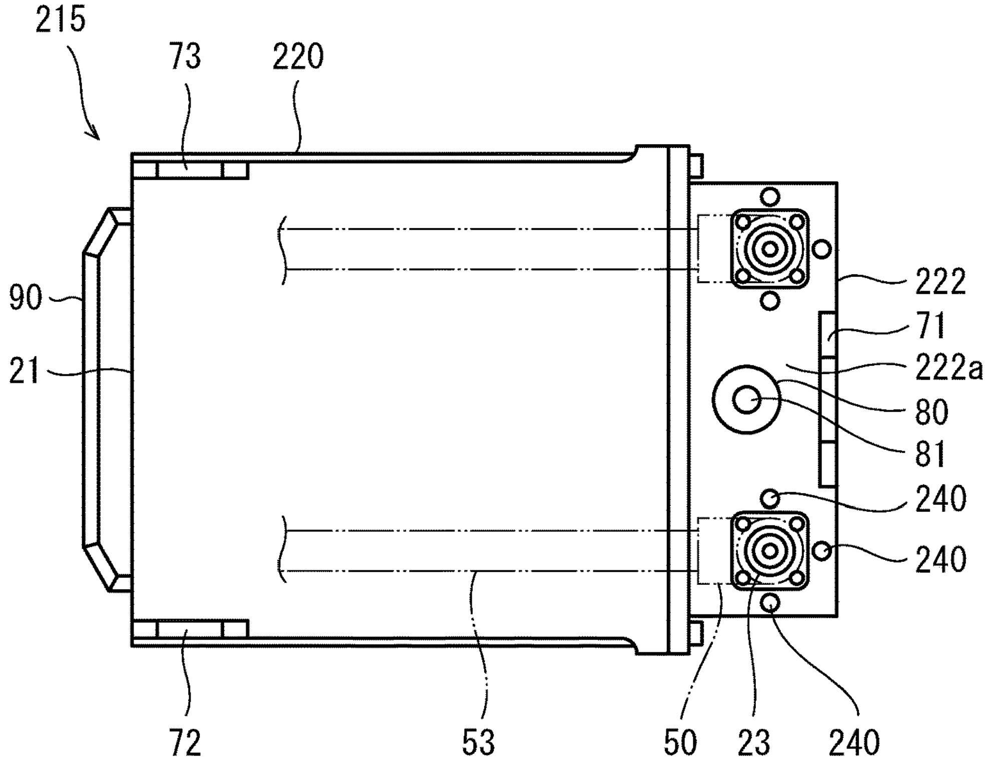
FIG. 9 is a plan view of the battery pack according to Embodiment 3.

FIG. 9 is a plan view of a battery pack 215 according to Embodiment 3. The same reference signs are used for the same components as in Embodiment 1, and the repetition of the same explanation is avoided. As shown in FIG. 9, the shape of a projection 240 of Embodiment 3 is different from the shape of the projection 40 of Embodiment 1 and the shape of the projection 140 of Embodiment 2. A casing 220 (a cover 222 of the casing 220) of the battery pack 215 includes the pin-shaped projections 240 projecting from an outer surface 222*a* of the casing 220. Specifically, three projections 240 are adjacent to the connector 23 in three directions orthogonal to the projecting direction P. The cable connector 50 and the electric cable 53 pass through a largest one of spaces each between two out of the three projections 240 when viewed from the projecting direction P.

According to this, the damage of the connector 23 can be prevented while adequately exposing the connector 23 to an outside. The projection 240 is columnar but is not limited to this and may have another shape (for example, a quadrangular prism). The number of projections 240 corresponding to one connector 23 is not limited to three and may be less than three or may be four or more. Since the other configurations are the same as those in Embodiment 1, the explanations thereof are omitted.

The present disclosure is not limited to the above embodiments. Modifications, additions, and eliminations may be made with respect to the configurations of the embodiments. For example, the projecting direction P of the connector 23, 24 is not limited to an upper direction and may be a lateral direction or a lower direction. In this case, the projecting direction of the projection 40, 140, 240 is also the lateral direction or the lower direction. The connector protected by the projection 40, 140, 240 is not limited to a connector for electric power supply and may be a connector for communication. The connector for communication may be located between the positive connector 23 and the negative connector 24 or between the projection 40 and the projection 41. The cover 22, 122, 222 may be integrated with the casing main body 21 as one piece. In this case, the casing 20 may include an opening closed by a lid.

A new embodiment may be prepared by combining the components described in the above embodiments. For example, some of components or methods in one embodiment may be applied to another embodiment. Some components in an embodiment may be separated and arbitrarily extracted from the other components in the embodiment. Moreover, the components shown in the attached drawings and described in the detailed explanations include not only components essential to solve the problems but also components for exemplifying the above technology and not essential to solve the problems.

What is claimed is:

1. A battery pack of a vehicle, the battery pack comprising:

a battery cell;

a casing accommodating the battery cell; and at least one connector projecting upward beyond an upper surface of a casing main body of the casing, the connector projecting in a direction orthogonal to the upper surface of the casing main body, the casing main body defining a battery cell accommodation space, wherein the casing includes at least one projection projecting outward from an outer surface of the casing, the projection projects in a projecting direction of the connector beyond the connector, the at least one connector includes an electrode terminal and a connector housing surrounding the electrode terminal and projecting outward from the outer surface of the casing, the connector housing is detachably fitted to a cable connector coupled to an end portion of an electric cable, and the at least one projection is adjacent to the connector housing so as to be spaced apart from the connector housing.

2. The battery pack according to claim 1, wherein the at least one projection is located partially around the connector.

3. The battery pack according to claim 1, wherein the at least one connector comprises two connectors located away from each other, and the at least one projection is located between the two connectors.

4. The battery pack according to claim 1, wherein the projection is adjacent to the connector so as to be spaced apart from the connector in two directions orthogonal to each other when viewed from the projecting direction.

5. The battery pack according to claim 4, wherein the projection includes a portion having an L shape when viewed from the projecting direction.

6. The battery pack according to claim 1, wherein the connector is located at a corner of the outer surface of the casing, and when viewed from the projecting direction, at least a part of the projection is located closer to an outside of the casing than the connector is.

7. The battery pack according to claim 1, wherein the projection covers the connector when viewed from one direction orthogonal to the projecting direction.

8. The battery pack according to claim 1, wherein the casing and the projection are integrated as one piece.

9. The battery pack according to claim 1, wherein the casing includes a hook insertion hole exposed to an outside of the casing.

10. The battery pack according to claim 1, wherein a side surface of the casing includes a lift surface which faces downward and with which a finger of a worker contacts from a lower side.

11. The battery pack according to claim 1, wherein the projection projects outward beyond the connector housing.

12. The battery pack according to claim 1, wherein with the cable connector fitted to the connector housing, the connector housing overlaps the projection when viewed from a direction orthogonal to the projecting direction.

13. The battery pack according to claim 1, wherein the cable connector is an L-shaped connector and extends in a direction orthogonal to the projecting direction, and when viewed from the projecting direction, the projection exposes a part of a periphery of the connector housing to a lateral side.

14. The battery pack according to claim 1, wherein a connector housing of the cable connector is externally fitted to the connector housing of the connector.

15. A battery pack comprising:

a battery cell;

a casing accommodating the battery cell; and at least one connector projecting upward beyond an upper surface of a casing main body of the casing, the connector projecting in a direction orthogonal to the upper surface of the casing main body, the casing main body defining a battery cell accommodation space, wherein the casing includes at least one projection projecting outward from an outer surface of the casing, the projection projects in a projecting direction of the connector beyond the connector, the connector is located at a corner of the outer surface of the casing, when viewed from the projecting direction, at least a part of the projection is located closer to an outside of the casing than the connector is, and the projection includes an opening through which the connector is exposed in a direction orthogonal to the projecting direction and toward an inside of the casing when viewed from the connector.

16. The battery pack according to claim 15, wherein the projection projects upward beyond the upper surface of the casing main body.

17. The battery pack according to claim 15, wherein the projection projects in the projecting direction beyond the connector.

18. The battery pack according to claim 15, wherein the connector is cylindrical, and the projection is adjacent to the connector so as to be spaced apart from the connector in two directions orthogonal to each other when viewed from the projecting direction.

19. A battery system comprising:

the battery pack according to claim 15;

a cable connector fitted to the connector and located in the opening; and an electric cable coupled to the cable connector and extending from the connector along the outer surface of the casing, the outer surface facing the projecting direction.

20. The battery pack according to claim 1, wherein the connector projects upward in a vertical direction of the vehicle when the battery pack is mounted on the vehicle.

* * * * *